United States Patent [19]

Squier et al.

[11] 3,852,146

[45] Dec. 3, 1974

[54] CONTOURED ARTICLE WITH THREE DIMENSIONAL SURFACE THEREON

[75] Inventors: William H. Squier, Taylors; William E. Poteat, Greer, both of S.C.

[73] Assignee: M. Lowenstein and Sons, Inc., New York, N.Y.

[22] Filed: Oct. 2, 1972

[21] Appl. No.: 294,353

Related U.S. Application Data

[63] Continuation-in-part of Ser. No. 272,340, July 17, 1972.

[52] U.S. Cl. .................................... 161/19, 161/64
[51] Int. Cl. .............................................. B44f 7/00
[58] Field of Search .................. 161/19, 64; 117/10

[56] References Cited
UNITED STATES PATENTS

| | | | |
|---|---|---|---|
| 3,152,002 | 10/1964 | Wisotzky et al. | 117/10 |
| 3,215,584 | 11/1965 | McConnell et al. | 161/64 |
| 3,496,054 | 2/1970 | Baigas | 161/64 |
| 3,585,099 | 7/1971 | Van Buskirk | 161/64 |
| 3,591,401 | 7/1971 | Snyder et al. | 161/64 |

Primary Examiner—William E. Schulz
Attorney, Agent, or Firm—Wellington M. Manning, Jr.

[57] ABSTRACT

A contoured article having three dimensional surface effects is disclosed herein, such as a headliner or floor covering for a vehicle. The contour of the article and at least one three dimensional decorative surface are incorporated into the article during molding. The three dimensional surface preferably is an exact replica of the surface of a textile product. Further, the final article may be surface decorated, if desired. A process for producing a contoured article having a three dimensional decorative surface is also disclosed and claimed herein. The process involves the provision of a master mold, the cavities of which define both the contour and the three dimensional surface design. A foamable composition is cast into one section of the master mold after which the mold sections are brought into register while the composition is fused or cured in situ, conforming to the contour and three dimensional surface cavities of the mold. The foam article produced thus possesses the contour of the article with at least one surface displaying a three dimensional decorative effect. After removal from the mold, the article may be used as is, or may be further decorated as exemplified by the application of an adhesive to the three dimensional surface followed by flocking with textile fibers.

14 Claims, 3 Drawing Figures

3,852,146

CONTOURED ARTICLE WITH THREE DIMENSIONAL SURFACE THEREON

CROSS-REFERENCE TO RELATED APPLICATION

This application is a continuation-in-part of co-pending application Ser. No. 272,340, filed July 17, 1972 and entitled THREE DIMENSIONAL DECORATIVE MATERIAL AND PROCESS FOR PRODUCING SAME.

BACKGROUND OF THE INVENTION

Numerous products have heretofore been produced where both woven and nonwoven fabrics were provided with a layer of foam laminated thereto after which the composite was provided with a suitable backing so as to provide decorative textile materials. In such situations, the fabric which is a costly part of the laminate is completely enclosed by the foam, backing and the like and thus only provides strength for the composite. Further approaches include manufacturing techniques where decorative materials have been produced by expanding a foam on a temporary or permanent backing other than a textile material, applying an adhesive to the foam, flocking the foam and then embossing to provide a desired pattern or design in the material. Embossing has generally been accomplished by engraved roll techniques.

Other prior techniques include foaming and embossing followed by flocking or the like where the product is physically or chemically deformed to assume the desired configuration. Printing an adhesive design onto a substrate, and flocking the adhesive area, followed by embossing has also been practiced. Products manufactured according to the above techniques have been utilized for floor coverings, wall coverings, draperies and for other aesthetic purposes.

Further effort has been expended in the area of articles having decorative fabrics and the like affixed thereto. For example, the floor liner in an automobile is now generally a tufted, backed carpet that has been formed to fit the floor pan of the vehicle. Likewise headliners and trunk liners for vehicles have been produced by utilizing felt, woven and nonwoven textiles and vinyls which are supported in various ways around the particular area of the vehicle.

Problems have been noted in both of the abovedefined areas, namely, the production of decorative textile materials and the utilization of textile materials for internal decoration of automobiles and the like. For example, the woven, nonwoven, knitted, tufted or other textile materials heretofore utilized are expensive. Furthermore, definite limitations exist in the design parameters for such prior art products that simulate textile products. The molding of a tufted carpet, for example, is a very intricate process if one is to properly form the carpet to achieve the desired configuration and at the same time avoid damage to the tufts or pile, the adhesive that may be employed and/or the carpet backing. Hence, while numerous techniques have been devised for the deployment of decorative textile materials as laminates or as the contoured article per se, such techniques have been cumbersome, expensive, and lacking in improved properties for the ultimate, decorative, contoured article.

The present invention provides a unique contoured product having a molded three dimensional decorative surface thereon along with a unique process for the production of same. Products of excellent aesthetic quality are produced which also possess good resilience, abrasion resistance, acoustical and insulative properties, to mention a few. Moreover, there is virtually no limit to the decorative design that may be incorporated into the three dimensional decorative surface of the article being produced. Inso doing, the operational process of the present invention avoids the problems of the prior art as does the product produced thereby. The process and product of the present invention represent definite improvements over those previously known and utilized by the prior art.

The prior art is devoid of any teaching or suggestion of the subject invention. Exemplary of the prior art are U.S. Pat. Nos.: Re.23,741 to Summers; Re.26,385 to Gilchrist; 2,106,132 to Feinbloom; 2,691,611 to Saks; 2,714,559 to Sheffield, et al.; 2,784,630 to Koprow, et al.; 2,963,381 to Leimbacher; 3,194,702 to Geller, et al.; 3,196,030 to Petry; 3,215,584 to McConnell, et al.; 3,219,507 to Penman; 3,224,984 to Palmer; 3,322,606 to Koller; 3,365,353 to Witman; 3,408,248 to Maass; 3,436,245 to Grundman; 3,496,054 to Baigas, Jr.; 3,518,154 to Broadhurst; 3,528,874 to Spencer; 3,540,974 to Broadhurst; 3,575,778 to Wilcox; and 3,591,401 to Snyder, et al.

SUMMARY OF THE INVENTION

It is an object of the present invention to provide a novel process for the production of a contoured article having an integral decorative three dimensional surface thereon.

Another object of the present invention is to provide a novel process for the production of a contoured article having a flocked three dimensional surface thereon.

Still further, another object of the present invention is to provide a novel contoured article having at least one three dimensional decorative surface.

Still another object of the present invention is to provide a novel contoured article having a flocked three dimensional surface thereon.

Another object of the present invention is to provide a contoured, simulated textile article.

Generally speaking, the present invention relates to an article having a predetermined contour, said article further having on at least one surface thereof an integral three dimensional design produced therein, said design surface having short fibers randomly secured thereon.

More specifically the product of the present invention is a polymeric foamed article, the foam having been cured or fused in situ in a mold so as to assume the particular contour of the mold cavities simultaneously with the three dimensional decorative design on at least one surface thereof. The three dimensional decorative design on the surface of the foam article is provided with an adhesive layer to which is secured a plurality of short fibers so as to simulate the appearance of a woven, knitted, nonwoven or tufted textile article that has been formed to the molded contour.

The products of the present invention are especially useful in the automotive industry as, for example, headliners for vehicles having a felt, carpet, or other type appearance, molded floor coverings that simulate tufted or nonwoven carpets, trunk liners and the like. Moreover, the products of the present invention now permit wide design variation without excessive costs. Likewise, products made according to the present invention find application in various other industries and for various other uses.

Laminated products may also be produced according to the teachings of the present invention where different materials are employed. For example, utilizing the matched mold concept, a polymeric composition may first be cast into the mold so as to produce a rigid or semi-rigid base that conforms to the covered mold cavities. Thereafter, a foamable composition may be applied directly onto the composition during formation of rigid or semi-rigid structure utilizing a particular interface, if necessary, with the composition foaming in situ in conformity with the remainder of the mold cavities to complete the article including the three dimensional decorative surface. Thereafter, depending upon the particular demands for the ultimate article, further decoration may be added, if desired, by way of flocking, or the like, so as to achieve the desired ultimate product.

Products produced according to the present invention may also be reinforced as desired to achieve a particular strength characteristic necessary for suitable performance thereof. In this regard, reinforcing materials may be deployed internally of the article being produced. Such reinforcing material could be supported by the mold or a two-step operation may be utilized where a rigid, semi-rigid or flexible structure forming composition is first provided in the bottom of the mold onto which the reinforcing material is applied followed by casting additional foamable material thereover which is cured in situ to entrap the reinforcing material.

The process of the present invention generally comprises the steps of providing a master mold, said mold having matched sections with a three demensional surface design provided on at least one of said sections; casting a foamable polymeric composition into said molds and fusing or curing same in situ; and removing the foamed article having the contour of the mold cavities with the three dimensional decorative design on at least one surface thereof.

More specifically the instant process is preferably practiced by employing a pair of matching recess and insert molds. Either the insert or recess half has an attachment therein which has cavities defining exact replicas of a particular design to be duplicated. The foamable composition, preferably a hydrophillic polyurethane, is cast into the mold and permitted to cure therein. If desirable or necessary, heat or other means may be utilized to further the in situ curing of the foam. After the foam composition has cured, the article produced thereby is removed from the molds and now displays a contour defined by the mold cavities with the three dimensional decorative surface provided on at least one surface thereof. For certain end uses, the product is now complete. Preferably, however, the design of the three dimensional decorative surface is such that it is best provided with further decoration, so as to simulate a woven, nonwoven, knitted, or tufted textile material for example. Subsequent to removal of the article from the molds, the three dimensional decorative surface is thus preferably coated with an adhesive, after which, short fibers are deposited over the adhesive so as to become secured therein. The final product will then have the surface appearance of the particular article being duplicated and the flock fibers or other suitable decoration will provide the necessary texture for a more accurate simulation of the duplicated design.

Depending upon the particular design being reproduced in the surface of the contoured article, it may be desirable to vary the flock fibers across the article, in the hills and valleys of the design for instance. Likewise, it may be desirable only to flock one of the two areas or to flock both areas. Fiber variation could include type, denier, length, color, texture or the like.

Certain other features of the process of the present invention may be employed if desired. For example, should the design being reproduced in three dimension on at least one surface of the article be a carpet which requires extremely fine definition, it may be desirable to precoat the mold having the reverse of the design provided therein to avoid the entrappment of air at the outer surface of the foamed article, or to provide air vents in the mold. Furthermore, a preferred means of flocking the foamed article produced according to the teachings of the present invention is in natural state which is slightly damp. It has been unexpectedly found that the abrasion resistance of a urethane flocked article is vastly superior where the article is in the natural or slightly wet state prior to flocking than when the article has been pre-dried. An oversized mold may also be used to compensate for foam shrinkage. Likewise, the article may be stretched during flocking to increase or control fiber density after flocking.

Subsequent to molding and decoration of the article according to the teachings of the present invention, further treatment may be provided if desired. For example, a suitable pressure sensitive adhesive may be applied to the side of the article opposite the decorative side so as to secure the article in place during use. Furthermore, if necessary for the ultimate disposition of the article, both sides of the article may be provided with a decorative three dimensional design.

DESCRIPTION OF THE SPECIFIC EMBODIMENTS

Referring to the Figures, specific embodiments of the present invention will now be described in detail. Making reference to FIG. 1, the general process steps of the present invention are set forth. Following the process line, a master mold is provided having general cavities therein that represent the particular contour of the article being produced. At least one of the mold sections, either recess or insert, is provided with a three dimensional surface design to be reproduced on the article being molded. For example, the three dimensional surface design may be a replica of any carpet, a brick pattern, wood grain, or the like. In fact, the particular design that may be reproduced on the surface of an article being molded, as an integral part thereof, is virtually unlimited. Preferably, the mold is produced having the particular contour of the article in the two sections, for example, the contour of the floor of a vehicle. One of the mold sections is then provided with an attachment on the face thereof, the attachment having a three dimensional design to be reproduced on the surface of the contoured article, for example, a three dimensional replica of a carpet pattern.

A polymeric composition is cast into the cavities of one section of the mold and the other mold section is brought into register therewith. The polymeric composition may form a rigid, semi-rigid, or pliant article. Register of the mold sections may be designed according to the particular polymeric composition being utilized so as to completely enclose the composition or with spacers between the sections to provide room for controlled expansion of the polymeric material, if, for example, a foamable composition is employed, thus determining the thickness of the molded article. In any event, the polymeric composition is fused or cured in situ in the mold where it assumes the contour of the mold cavities and at least one surface of the article further assumes the three dimensional design characteristics thereon.

In situ curing of the polymeric composition may be conducted under ambient conditions or under the influence of heat or the like as required for the particular polymeric composition. After the polymeric composition has cured in situ, the article can then be removed from the mold and depending upon the intended use for same, may then be complete or may require further treatment. Molded articles having a carpet pattern defined in one surface thereof would require flocking to better simulate a textile carpet. Similar decoration may also be desirable for the majority of products produced according to the present invention.

Figure 1:
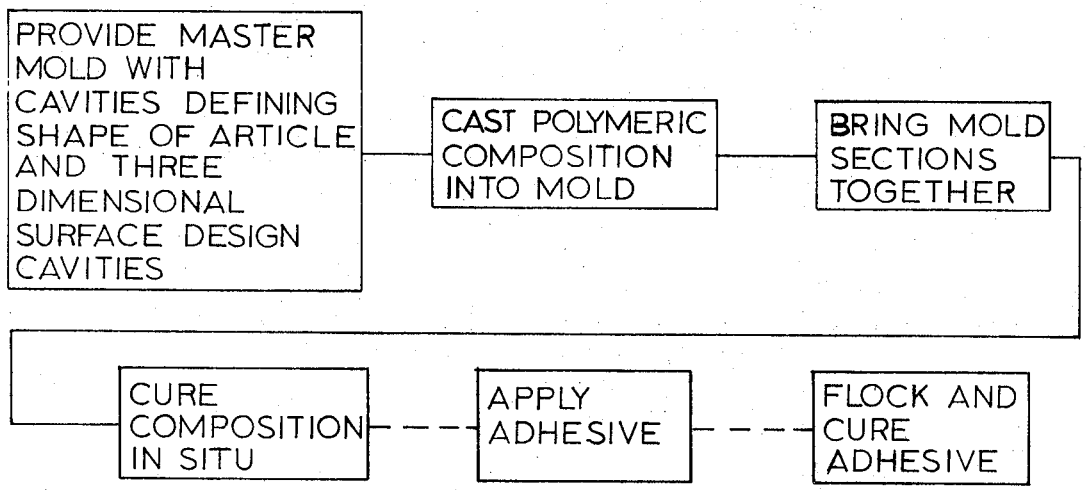
FIG. 1 is a block diagram depicting the general scheme of a process according to the teachings of the present invention.

As represented by broken lines in FIG. 1, subsequent to removal of the article from the mold, an adhesive may be applied to the three dimensional decorative surface of the article. The adhesive is employed to secure decorative materials such as short fibers to the article and may contain pigments therein to mask the foam. Adhesive may thus be applied to all of the three dimensional surfaces, or to selected surfaces as desired. Thereafter, the short textile fibers or the like may be applied thereto in predetermined fashion, after which the adhesive is cured. The article is thus complete unless further treatment is desirable for the opposite side thereof. For example, the opposite side of the article may also have a three dimensional design to be decorated, may be coated with a pressure sensitive adhesive to secure same in place, or the like.

Figure 2:
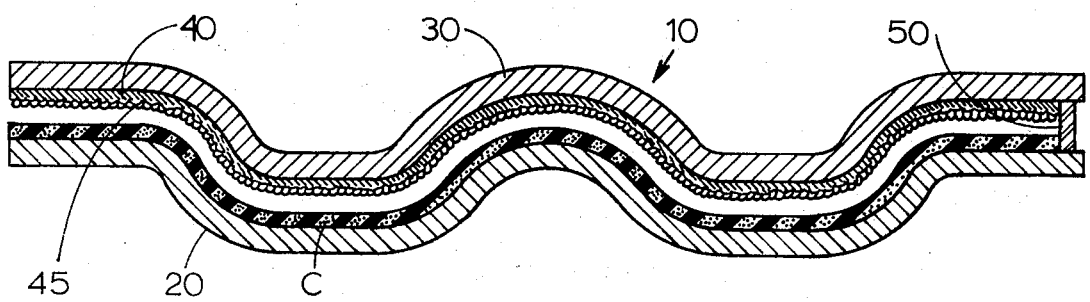
FIG. 2 is a side cross sectional view of a master mold embodying teachings of the present invention.

Making reference to FIG. 2, an illustration of a molding system according to the teachings of the present invention will be described in detail. A mold generally indicated as 10 is provided in the process scheme utilizing a recess mold section 20 and a matching insert mold section 30. Recess section 20 and insert section 30 of mold 10 are each provided with complementary contours of the article being reproduced. As shown in FIG. 2, the article would be a molded article to assume the configuration of the floorboard of a vehicle. Preferably, the mold is deployed at the attitude shown in FIG. 2 and as such the insert section of the mold 30 would be raised during the casting of the foamable or other polymeric composition therein. At that time, the foamable composition is cast into the recess mold 20 and the insert mold 30 brought into register therewith. Insert mold 30 is provided with an attachment 40 secured thereon and conforming to the contour thereof, attachment 40 having a reverse replica of a carpet as indicated by tuft replicas 45 appearing on the underside of attachment 40. With foamable composition C provided in recess mold section 20, and insert section 30 brought into register therewith, a plurality of spacers 50 permit proper spacing between the insert and recess sections 20 and 30 respectively of mold 10. As such, the foamable composition under ambient conditions or under the influence of heat, electrical or other means expands so as to fill the cavities of the mold and assume the contour thereof. Hence, the contour of the article and the three dimensional surface design are simultaneously produced in the article during a single molding step though the surface design cavities may be precoated to achieve good surface definition. As such, the floor covering article will emerge from the molds of FIG. 2, and after trimming, has the appropriate contour for a proper fit in the floorboard of the vehicle with the replica of a tufted carpet or the like being integrally molded into the upper surface thereof. As seen in FIG. 2, the mold attachment must also follow the upper contour of the mold cavities to produce the proper article. Attachment 45 is thus preferably produced from a flexible material which can be readily formed to follow the mold cavities. An RTV silicone attachment is exemplary and is preferred. The RTV silicone further possesses good mold release qualities which is especially important for the attachment to insure excellent definition of the replica on the article surface. Mold attachment 40 may generally be produced by applying a release agent to the surface to be simulated and molding directly thereover. In certain circumstances, however, where the design is very intricate a plaster cast is first made followed by destruction of master. RTV silicone can then be molded over the plaster cast to promote a plug prototype and the final silicone mold made thereover.

Figure 3:
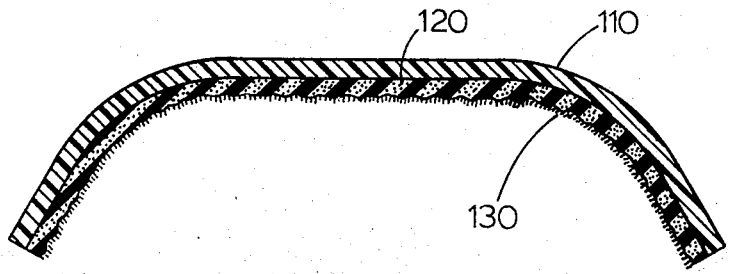
FIG. 3 is a side cross sectional view of an article produced according to teachings of the present invention.

FIG. 3 illustrates a further product and technique according to the teachings of the present invention. The product illustrated is a cross section of a headliner employed by the automotive industry to fit into the top interior of an automobile or the like. As illustrated, a rigid polymeric backing 110 is shown having the suitable contour for the inside top of an automobile body. Bonded to the underside of the rigid backing 110 is a resilient foam layer 120 that likewise follows the inner contour of the headliner. The foam inner layer 120 is, of course, provided with a three dimensional decorative surface, the design of which is unlimited as mentioned hereinbefore. A headliner generally is a woven fabric or an embossed vinyl. As such, the design may well be a replica of a textile woven fabric, the embossed vinyl or the like. Flock fibers 130 are secured to the surface design of foam member 120 by a suitable adhesive system or the like to completely simulate the textile fabric, vinyl or the like. In this regard, it should be pointed out that the particular fibers, as to type, size, color, length and the like, may vary with the particular design having been produced in the foam layer. A headliner such as shown in FIG. 3 represents an improved product for the automotive industry. Rigid backing 110 provides ample support to permit use of the headliner without any intermediate auxiliary supports. Further, the product may be designed to snap fit into the car body whereby installation procedures are simplified.

Master molds for use according to the present invention may be produced by numerous means. Preferably, however, at least the insert having the three dimensional surface design cavities is produced directly from the surface being simulated. An exact replica of the surface with good mold definition is thus a reality. Moreover, the entire mold may be manufactured by the same process as defined below where one or both mold sections have the three dimensional surface design cavities integral therewith instead of using an attachment having the surface design cavities thereon. The article to be reproduced, either the general article or the model having the surface to be simulated may be placed within a retainer and a polymer composition cast thereover. The polymer composition is then cured around the article and after removal possesses mold cavities defining the portion of the article contacted by the composition. Various compositions may be employed such as vinyls, rubbers, urethanes and the like. A room temperature vulcanizable (RTV) silicone rubber composition is preferred due to ease of use, good definition in the cavities, and good inherent mold release qualities. an attachment produced according to the above technique is then added to either the insert and/or recess section of the master mold depending upon the article being molded, the attachment conforming to the general cavity shape.

Polymeric compositions that may be molded according to the present invention are quite inclusive as exemplified by vinyls, rubbers, urethanes and the like. Preferably the composition is a foamable composition and most preferably, the composition is a hydrophyllic polyurethane. The method of applying the composition to the mold varies with the particular composition employed. For example, a foamable composition may be sprayed, poured or the like. On the other hand, a polymeric composition that produces a solid rigid structure will not expand and must be applied under pressure to completely fill the mold cavities. Furthermore, under certain conditions with very intricate surface design, it is preferred to precoat the surface mold design cavities with the composition prior to casting.

Ultimate appearance, the particular adhesive system employed and/or the particular fibers employed for flocking may dictate the preferred flocking method for the deposition of the flocked fibers onto the molded product. For example, simulation of a textile product may be best accomplished if the fibers appear to be a part of a fiber bundle. Hence, short and/or long fibers may be employed depending upon the particular decorative pattern being simulated. Likewise, mechanical and/or electrostatic flocking techniques may be used for deposition of the fibers onto the article surface. Carpet simulation, for example, might require very short fibers to afford good tuft definition or might require long and short fibers if a different pile length is used in the carpet being simulated. Likewise, certain adhesives such as acrylic or urethane are best handled by random, mechanical flocking followed by further possible treatment to embed the fibers into the adhesive layer. While the selection of flock fibers is virtually unlimited, rayon, nylon and polyester fibers are preferred. Further, as mentioned above, the particular fiber as well as the length, color, and the like may be determined by the surface being simulated. In any event, once the molded product is produced according to the teachings of the present invention, any decoration may be provided therefor along the lines set forth in co-pending application Ser. No. 272,340, filed July 17, 1972 and entitled THREE DIMENSIONAL DECORATIVE MATERIAL AND PROCESS FOR PRODUCING SAME.

Various adhesive systems may also be employed to secure fibers or other decorative materials to the molded article. For example, acrylic, urethane and hot melt type adhesives may be suitably employed. Such adhesives may be applied as desired as exemplified by spraying and brushing for the acrylics and urethanes and by roll systems for the hot melts. Pigment may also be added to the adhesive composition to blend with the color of the flock fibers. Such pigmentation adds to the overall color effect while masking the foam from view. Conversely, however, the foam may be colored to achieve similar results.

Certain of the polymer compositions experience shrinkage after molding, the effect of which should be considered in the manufacture of the mold. For example, if a carpet design is desired for an inlay for the floorboard of an automobile, it may be desirable to oversize the mold in general, and also the surface design so as to compensate for shrinkage of the polymer foam article. Enlargement can be easily handled under normal circumstances for the article per se. The decorative surface, however, especially a carpet pattern is different. Shrinkage of the foam can cause the carpet to appear denser than normal if only a larger pattern in the attachment is provided. To avoid this distorted appearance the carpet master may be produced oversized prior to casting so as to provide an enlarged design in the mold. The foamable composition can then be applied into the enlarged design mold and after forming, will shrink to the normal size of the carpet so as to produce an exact replica of the carpet pattern. Enlargement of the carpet master may be brought about by an enlarged construction of the master to allow for the anticipated shrinkage.

The present invention may be more fully understood by reference to the following examples.

Example 1

A minature (17 inch long) silicone rubber matched mold was produced with the contour of a molded carpet for an automobile floorboard, having a cross sectional configuration similar to that set forth in FIG. 2. A silicone rubber mold attachment having a tufted carpet cavity definition was then secured to the insert (top) section of the matched mold. The mold attachment was produced by placing a piece of carpet within a retainer wall and pouring plaster of paris thereover. The carpet was then burned from the plaster of paris with hdyrochloric acid and the plaster of paris mold was placed within the retainer. An RTV silicone rubber composition was then poured over the plaster of paris within the retainer wall and allowed to stand until it solidified. The RTV silicone composition included 100 parts of Silastic G, an elastomeric polysiloxane resin, manufactured by Dow Corning Corporation, Midland, Mich.; 10 parts of a catalyst supplied by Dow Corning Corporation for Silastic G, (unidentified by Dow Corning) and 10 parts of a thinner, a 100 per cent dimethyl polysiloxane at 20 centistokes viscosity. The ingredients were mixed thoroughly and deaired by means of a vacuum chamber. After the composition had solidified, it was removed from the retainer along with the plaster of paris. The silicone rubber mold exhibited protrusions and represented a prototype from which the final RTV silicone mold was to be produced. The prototype was then placed within the retainer and was sprayed with Pattern Release 202, an aerosol containing a refined petroleum jelly, methylene chloride and a fluorinated hydrocarbon, manufactured by National Engineering Products, Washington, D. C. Further RTV silicone composition as defined above was then poured into the retainer so as to produce the mold. Sections of this particular mold configuration were then joined together in seamless construction by use of Silastic 732 adhesive, a room temperature vulcanizable elastomeric silicone adhesive composition manufactured by Dow Corning, to produce the entire attachment. The attachment was then secured to the insert section of the mold.

A foamable composition was produced by mixing equal parts of water with a hydrophyllic polyisocyanate, FHP 10-31, produced by W. R. Grace and Company, Clarksville, Md., and 2 drops of L—520, a surfactant, produced by Union Carbide Corporation, N.Y., N.Y. The composition was mixed by hand for approximately 45 seconds and poured into the cavities of the recess (bottom) mold. The top mold member was then brough into register with the bottom mold member and the excess composition allowed to foam out around the edges. After 10 minutes, the top mold was removed and the molded product lifted therefrom. The molded product possessed a cross sectional contour as shown in FIG. 2. The top surface of the article exhibited a three dimensional design of the tufted carpet master. The particular carpet design being simulated, due to the intricacy of the design caused a few entrapped air bubbles in the top of the tuft area. Since, however, it has been determined that the mold may be precoated prior to casting the foamable composition, this particular sample was considered to be a success.

The surface of the molded automobile carpet having the simulated tuft design was then coated with Cyanobond U283/40, a urethane adhesive produced by American Cyanamid Company, Stamford, Conn. Nylon fibers having a length of approximately 0.025 inch were then randomly deposited thereon and the article cured at 260°F. for 20 seconds.

The ultimate article produced as a minature simulated carpet having the particular contour defined above. Excellent carpet appearance was evident except for the areas where the entrapped air bubbles were found.

Example 2

The procedure of Example 1 was followed with the exception that the carpet attachment mold was precoated with the foamable composition prior to pouring additional composition into the recess section of the mold. No entrapped air was visible in carpet design surface. A very excellent simulated carpet resulted having the contour of the floor of an automobile.

Example 3

A flat carpet mold was produced by casting the foamable composition within a retainer wall over an RTV silicone mold produced from the carpet as set forth in Example 1. The flat molded article having the carpet pattern on one side thereof was then dried in an oven at 160°F. after which AA-635A, an acrylic adhesive produced by Raffi and Swanson, Wilmington, Mass. was applied to the carpet design surface. Very short, 0.025 inch red, rayon ribers were than D.C. flocked over the surface having the adhesive thereon and the article was cured for 10 minutes at 260°F. A very good three dimensional carpet sample resulted. (generally 12–16 per cent — being worked on by Grace).

Example 4

Example 2 was repeated with the exception that subsequent to removal of the molded article from the mold, the article was dried in an oven for about 5 minutes at 200°F. Thereafter, the adhesive of Example 3 was brushed onto the carpet surface and blue rayon fibers, 0.025 inch, were D.C. flocked across the surface, followed by curing in an oven for 10 minutes at 260°F. An excellent simulated tufted carpet with tuft feel and appearance resulted. The article, of course, had the contour of the cross sectional configuration as shown in FIG. 2.

Example 5

Example 2 was reproduced with the time for in situ foaming varies so as to determine a practical length of time to permit foaming of the urethane in the mold. Samples were produced with a 2½, 3½, and 5 minute residence time, compared to the 10 minutes utilized in Example 1. At 2½ the article was not completely formed, while at 3½ and 5 minutes, completely formed articles were produced, thus indicating successful formation of the foamed article in times of less than 5 minutes.

Example 6

Example 2 was repeated, using the acrylic adhesive of Example 3. A contoured article having excellent surface simulation of a tufted carpet resulted.

Example 7

Example 1 was reproduced with the exception that the polyisocyanate foamable composition contained as the isocyanate ingredient, FHP-10-31-10, a very high modulus, hydrophillic polyisocyanate, also produced by W. R. Grace. The product produced followed the contour of the mold, but lacked a good quality definition of the carpet surface.

Example 8

Example 7 was reproduced with the exception that the polyisocyanate utilized was FHP-10-31-15, an intermediate modulus, hydrophillic polyisocyanate produced by W. R. Grace, was poured on top of a first poured first layer of FHP-10-31-10, the very high modulus polyisocyanate. The molded product showed a definition better than in Example 7, though the bonding between the two compositions was not felt to be satisfactory.

Example 9

Example 8 was reproduced with the exception that the intermediate modulus polyisocyanate was omitted and a top layer of polyisocyanate, FHP-10-31, which produces a much softer foam was cast onto the high modulus polyisocyanate. This composite proved quite satisfactory in bonding qualities as well as carpet definition in the upper surface thereof and is felt to be acceptable as a product that could be used as a one-piece headliner for an automobile either as is, or flocked or further decorated.

Example 10

The article produced from Example 8 was brushed with Cyanobond U283/40, a urethane adhesive manufactured by American Cyanamid Company, Stamford, Conn., after which short nylon fibers were evenly deposited over the surface thereof. The article was then cured at 260°F. for 20 minutes. An excellent simulated carpet article resulted.

Example 11

Molded articles having a simulated carpet design as produced in Example 2 and Example 6 were utilized to determine the abrasion resistance of the flocked fibers secured thereto. The articles tested were cut in half with one half being dried followed by flocking and the other half flocked in the condition in which it was removed from the mold. Flocking conditions were as set forth in Examples 2 and 6. All of the samples were then checked to determine the abrasion resistance on a CS-17 wheel, at a 1,000 gram load for 4,000 cycles. The undried, flocked samples proved to have roughly twice the abrasion resistance as the dried, flocked samples.

Example 12

It was determined that samples produced according to the Example 1 after 2 weeks exhibited a stabilized shrinkage from 17 inches to 14.5 inches or 14.75 per cent. This shrinkage is due to the shrink characteristics of the particular polyisocyanate utilized. It was thus suggested that an oversized mold might be produced to compensate for controlled shrinkage at a 12 to 20 per cent level so as to insure a proper fit of the article after shrinkage from the oversized level. Furthermore, the density of flock would be increased to enhance the overall luxury carpet appearance or the overall appearance of the particular design being incorporated therein. The mold, of course, was made oversized according to particular measurements. The carpet tufts, however, represent a different problem. An oversized tufted brick master was produced using 2 inch × 6 inch wooden blocks with a ½ inch mortar spaced therebetween. This master was covered with the RTV silicone and a mold attachment was produced thereby.

Products molded according to the procedure of Example 1, using the oversized mold described above, shrunk after molding and assumed the approximate dimensions as originally intended. Moreover, shrinkage of the carpet design surface evidenced a denser flock, while the overall carpet appearance was very good.

Having described the present invention in detail, it is obvious that one skilled in the art will be able to make variations and modifications thereto without departing from the scope of the invention. Accordingly, the scope of the present invention should be determined by the claims appended hereto.

What is claimed is:

1. A molded article of manufacture, said article comprising a molded foam polymeric mass of a predetermined shape, said mass having a three dimensional design molded in situ into at least a portion thereof, said three dimensional surface having an adhesive layer thereon and textile fibers secured to said adhesive layer.

2. A molded article of manufacture as defined in claim 1 wherein the three dimensional surface design simulates a textile material.

3. A molded article of manufacture as defined in claim 1 wherein the design is simulative of a textile material.

4. A molded article of manufacture as defined in claim 3 wherein the textile material is a carpet.

5. A molded article of manufacture as defined in claim 4 wherein the predetermined shape of the polymeric mass conforms to the at least a portion of the floor of a vehicle.

6. A molded article of manaufacture as defined in claim 3 wherein the predetermined shape of the polymeric mass conforms to the top interior of a vehicle body.

7. A simulated textile product, said product comprising a molded polymeric foam mass, said mass having a predetermined shape, said mass having a three dimensional design molded in situ into at least a portion thereof, said design being a replica in three dimension of a textile material, said design having an adhesive layer thereon, said adhesive having short textile fibers embedded therein, said fibers having been selected and deposited in a predetermined fashion to assume the fiber appearance of the textile material of which the design is simulative.

8. A simulated textile product as defined in claim 7 wherein said design surface is a replica of a carpet.

9. A simulated textile product as defined in claim 8 wherein the polymeric mass is a foam and wherein said foam has a shape to fit the contour of at least a portion of the floor of a vehicle.

10. A simulated textile product as defined in claim 9 wherein said foam is a polyurethane foam.

11. A simulated textile product as defined in claim 10 wherein said fibers are flock fibers.

12. A simulated textile product as defined in claim 7 wherein said polymeric mass comprises a rigid polymer backing and a flexible polymer surface having the three dimensional design therein.

13. A simulated textile product as defined in claim 12 wherein said rigid polymer backing is a high modulus polyurethane foam and the flexible polymer surface is a flexible polyurethane foam.

14. A simulated textile product as defined in claim 13 wherein said polymeric mass has a shape to fit the top interior surface of a vehicle body.

* * * * *